3,507,858
2-PHENYLIMINO-3-SUBSTITUTED-5-
BENZYLIDENE-4-THIAZOLIDONE
George W. Sawdey, Rochester, N.Y., assignor to Eastman
Kodak Company, Rochester, N.Y., a corporation of
New Jersey
Original application May 13, 1964, Ser. No. 367,138, now
Patent No. 3,314,794, dated Apr. 18, 1967. Divided and
this application Aug. 11, 1966, Ser. No. 594,292
Int. Cl. C07d 91/18; C09b 23/04
U.S. Cl. 260—240    9 Claims

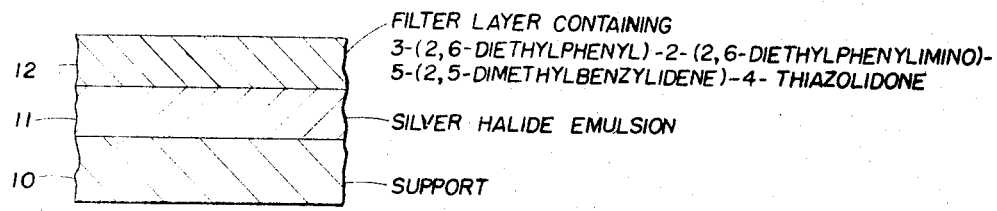
FIG·1
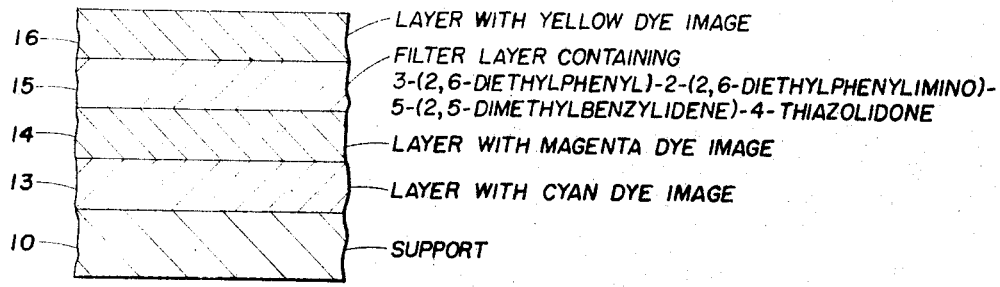
FIG·2

ABSTRACT OF THE DISCLOSURE

2 - phenylimino - 3 - substituted - 5 - benzylidene-4-thiazolidones, in which the substituent in the 3-position of said thiazolidone is either an alkyl group or a phenyl group such that at least one of the phenyl groups in the 3-position and the phenyl group of said phenylimino group has substituents in the 2- and 6-positions, are valuable ultraviolet absorbing agents for incorporating in photographic elements. The immediate ultraviolet absorbing agents are unexpectedly more stable than prior art 4-thiazolidone ultraviolet absorbing agents.

---

This is a divisional application of U.S. patent application Ser. No. 367,138, ultraviolet absorbers, filed May 13, 1964 now U.S. Patent 3,314,794 issued Apr. 18, 1967.

This invention relates to new ultraviolet absorbing compounds and their use in protecting various materials, particularly photographic elements and organic compositions such as plastic sheets against the harmful effects of ultraviolet radiation.

It is known that certain materials including cellulosic films and photographic layers are adversely affected by ultraviolet radiation when such materials are exposed to daylight. Ultraviolet radiation can cause undesired exposures in photographic layers especially when it is desired that the layer record an exposure from another portion of the spectrum, such as, in the green or red to which the layer has been spectrally sensitized. This is especially true in color photography where it is desired to record light from the visible portions of the spectrum. Thus in multilayer elements ultraviolet absorbing layers are used to advantage under the blue-sensitive and over the red-sensitive and green-sensitive layers.

Color photographs in which the dye images are formed by color development are subject to fading as a result of ultraviolet radiation in the viewing illumination. In addition, color photographs that contain residual couplers are subject to the formation of stain when exposed to ultraviolet radiation. Both dye fading and the formation of stain from residual couplers appear to be caused primarily by radiation having wavelengths close to the visual region of the spectrum, i.e., 360–400 m$\mu$.

Ultraviolet absorbing compounds which have high densities to these wavelengths as well as high stability to prolonged exposure to ultraviolet radiation are desired.

It is therefore an object of my invention to provide new ultraviolet absorbing compounds which have high optical densities to radiation having wavelengths shorter than 400 m$\mu$ without having appreciable densities to radiation of 400 m$\mu$ and longer wavelengths.

Another object is to provide ultraviolet absorbing compounds which are more stable on prolonged exposure to ultraviolet radiation than known absorbers.

Another object is to provide photographic elements having at least one light-sensitive layer protected with my ultraviolet absorbing layer.

Another object is to provide multilayer color elements with my ultraviolet absorbing layer to protect dye images subject to fading and residual couplers subject to staining upon prolonged exposure to ultraviolet radiation.

Still another object is to provide a method of protecting a developed multicolor photograph from the destructive effects of ultraviolet radiation by bathing said photograph in a solution of one of my ultraviolet absorbing compounds.

Still other objects will be apparent from the following specification and claims.

These and other objects are accomplished according to my invention by providing and using an ultraviolet absorbing compound represented by the formula:

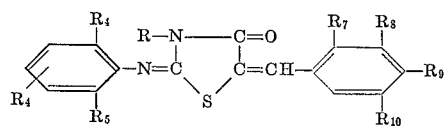

wherein R represents an alkyl group (e.g., methyl, phenylmethyl, ethyl, $\beta$-phenethyl, $\beta$-hydroxyethyl, $\beta$-sulfoethyl, $\beta$-sulfoethyl alkali metal salt, $\beta$-diethoxyethyl, octyl, dodecyl, hexadecyl, docosyl, cyclopentyl, cyclohexyl, etc.), and an aryl group (e.g., a

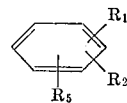

group); $R_1$ and $R_2$ each represent the same or a different group, such as, the hydrogen atom, a halogen atom (e.g., chlorine, bromine, iodine, and fluorine), and alkyl group (e.g., methyl, ethyl, dodecyl, docosyl, etc.); R, represents the hydrogen atom, an alkyl group (e.g., methyl, propyl, hexadecyl, docosyl, etc.), a sulfoalkyl group (e.g., $\beta$-sulfoethyl, $\beta$-sulfomethyl, $\gamma$-sulfopropyl, etc.), an alkali metal salt of said sulfoalkyl group, a carboxyalkyl group (e.g., $\beta$-carboxyethyl, $\gamma$-carboxypropyl, etc.), an alkali metal salt of said carboxy alkyl group, and a hydroxyalkyl group (e.g., $\beta$-hydroxyethyl, $\gamma$-hydroxypropyl, etc.); $R_4$ represents a halogen atom (e.g., chlorine, bromine, iodine, and fluorine) and an alkyl group (e.g., methyl, ethyl, butyl, dodecyl, hexadecyl, docosyl, etc.); $R_5$ represents any of the groups represented by $R_4$ and in addition can represent the hydrogen atom, such that when $R_5$ represents the hydrogen atom, R must represent a 2,6-substituted phenyl group; $R_4$ represents the hydrogen atom, a halogen atom as described previously, or an alkyl group (e.g., methyl, ethyl, hexyl, hexadecyl, docosyl, etc.); $R_7$ represents the hydrogen atom, a halogen atom as defined previously, an alkyl group (e.g., methyl, propyl, decyl, docosyl, etc.), an alkoxy group in which the alkyl group can be any of the alkyl groups defined for the R groups, the carboxy group or alkali metal salt (e.g., sodium, potassium, etc.) thereof, the sulfo group or alkali metal salt (e.g., sodium, potassium, etc.) thereof, etc.; $R_8$, $R_9$, and $R_{10}$ each can represent the same or a different group as defined for $R_7$ and in addition can represent a sulfamyl group, or substituted sulfonamido group (e.g., methylsulfonamido, benzenesulfonamido, etc.), a carbamyl group, and a substituted carbonamido group (e.g., acetamido, benzamido, etc.). By alkali metal in the salts of R, I mean Na, K, etc.

My compounds exhibit valuable ultraviolet radiation absorbing characteristics with high absorption in the ultraviolet and near visible region of the spectrum with almost no absorption at wavelengths of 400 m$\mu$ and longed. Especially valuable is the unexpectedly high stability of my compounds to prolonged exposures to ultraviolet radiation. My compounds have low melting points and are readily soluble in conventional solvents. They are valuable for use in protecting photographic elements and certain palstic materials.

The following typical compounds will illustrate my invention.

(1) 3-cetyl-2-(2,6-diethylphenylimino)-5-(2-methylbenzylidene)-4-thiazolidone

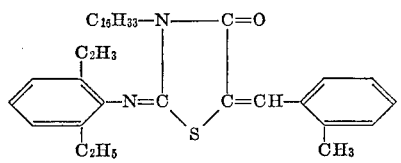

(2) 2-(2,6-diethylphenylimino)-3-octyl-5-(2-sulfobenzylidene)-4-thiazolidone sodium salt
(3) 3-cetyl-2-(2,6-diethylphenylimino)-5-(2-methoxybenzylidene)-4-thiazolidone
(4) 2-(2,6-diethylphenylamino)-5-(2-methylbenzylidene)-3-phenyl-4-thiazolidone
(5) 3-benzyl-2-(2,6-diethylphenylimino)-5-(2-methylbenzylidene)-4-thiazolidone
(6) 2-(2,6-diethylphenylimino)-5-(2-hexyloxybenzylidene)-3-phenyl-4-thiazolidone
(7) 3-(2,6-diethylphenyl)-2-(2,6-diethylphenylimino)-5-(2,5-dimethylbenzylidene)-4-thiazolidone

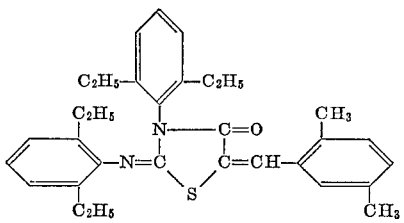

(8) 3-(2,6-diethylphenyl)-2-(2,6-diethylphenylimino)-5-(2-methylbenzylidene)-4-thiazolidone
(9) 2-(2,6-diethylphenylimino)-3-(2-ethylphenyl)-5-benzylidene-4-thiazolidone
(10) 2-(2,6-diethylphenylimino)-3-(2-ethylphenyl)-5-(2-methylbenzylidene)-4-thiazolidone
(11) 2-(2,6-diethylphenylimino)-5-(2,5-dimethylbenzylidene)-3-(2-ethylphenyl)-4-thiazolidone
(12) 3-(2,6-diethylphenyl)-2-(2,6-diethylphenylimino)-5-(2,4-dimethylbenzylidene)-4-thiazolidone
(13) 2-(2,6-diethylphenylimino)-5-(2,5-dimethylbenzylidene)-3-(3,5-dimethylphenyl)-4-thiazolidone
(14) 3-(2,6-diethylphenyl)-2-(2-ethylphenylimino)-5-(2-methylbenzylidene)-4-thiazolidone
(15) 3-(4-sec.-amylphenyl)-2-(2,6-diethylphenylimino)-5-benzylidene-4-thiazolidone
(16) 3-benzyl-5-(2-chlorobenzylidene)-2-(2,6-diethylphenylimino)-4-thiazolidone
(17) 3-benzyl-2-(2,6-diethylphenylimino)-5-(2-methyl-x-sulfobenzylidene)-4-thiazolidone sodium salt

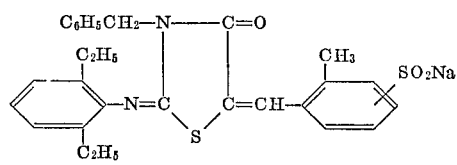

(18) 2-(2,6-diethylphenylimino)-3-(2,6-diethylphenyl)-5-(2-methyl-5-tert.-butylbenzylidene)-4-thiazolidone

(19) 2-(2,6-diethylphenylimino)-3-n-hexadecyl-5-(2,5-methylbenzylidene)-4-thiazolidone
(20) 3-(2,6-diethylphenyl)-2-(2,6-diethylphenylimino)-5-(3-dodecyloxybenzylidene)-4-thiazolidone
(21) 3-(2,6-diethylphenyl)-2-(2,6-diethylphenylimino)-5-(4-dodecylbenzylidene)-4-thiazolidone In general my compounds of Formula I prepared by condensing a compound having the formula:

II

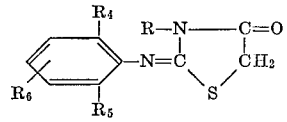

wherein R, $R_4$, $R_5$ and $R_6$ are as defined previously, with an aldehyde of the formula:

III

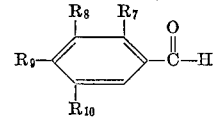

wherein $R_7$, $R_8$, $R_9$, and $R_{10}$ are as defined previously. Heat accelerates the condensations, temperatures varying from room temperature to the reflux temperature being useful. An inert diluent, e.g., acetic acid, methanol, ethanol, etc. can be used, if desired. Condensing agents, such as, piperidine, acetic anhydride, alkali metal carboxylates (e.g. sodium acetate, potassium acetate, etc.), etc. can be employed, if desired.

The compounds of Formula II are advantageously prepared by condensing a thiourea having the formula:

IV

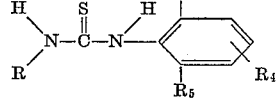

in which R, $R_4$, $R_5$ and R are as defined previously, with chloroacetic acid in the presence of sodium acetate in an inert diluent. Heat accelerates the condensations, temperatures varying from room temperature to the reflux temperature being used to advantage. Following the reaction the inert diluent is removed in vacuo or other suitable means, and the residue treated with water to remove excess chloroacetic acid, sodium acetate and sodium chloride. The insoluble product is then recrystallized from alcohol or other suitable solvent.

The compounds of Formula IV are advantageously prepared by adding a mixture of chloroform and a compound having the formula:

V

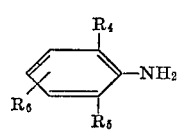

in which $R_4$, $R_5$ and $R_6$ are as defined previously, to a suspension of thiophosgene in water. The substituted isothiocyanate formed is then reacted with the appropriate amine $RNH_2$ to produce the compound of Formula IV.

The following representative syntheses will still further illustrate my invention.

COMPOUND 3

A mixture of 600 g. of 3-cetyl-2-(2,6-diethylphenylimino)-4-thiazolidone (intermediate 3), 174 g. of o-methoxybenzaldehyde, 50 ml. of piperidine, in 1500 ml. of ethanol was refluxed for 20 hours, then filtered. The filtrate was chilled and an amorphous solid separated, was collected, and recrystallized from a mixture of 500 ml. of 1,2-dichloroethane and 5 liters of methanol to yield 330 g. of product, M.P. 61–62° C.

INTERMEDIATE 1

2,6-diethylphenylisothiocyanate

A mixture of 224 g. of 2,6-diethylaniline and 250 ml. of chloroform was added over a period of 20–25 minutes to a vigorously stirred suspension of 196 g. of thiophosgene in 1200 ml. of water. The reaction began immediately, and the temperature rose to 60–70° C. When the addition was finished, the reaction mixture was stirred for an additional ½ hour. The chloroform layer was separated, evaporated, and the residue distilled under reduced pressure to yield 267 g. of product, B.P. 145–146/16 mm.

INTERMEDIATE 2

3-cetyl-1-(2,6-diethylphenyl)thiourea

To a stirred solution of 93 g. of hexadecylamine in 600 ml. of ligroin was added 73 g. of Intermediate 1 over a period of ½ hour. The mixture was stirred for one additional hour, and the product precipitated was collected, washed with petrolium ether, and recrystallized from acetone to yield 159 g. of product, M.P. 78–80° C.

INTERMEDIATE 3

3-cetyl-2-(2,6-diethylphenylimino)-4-thiazolidone

A mixture of 43 g. of Intermediate 2, 11.7 g. of chloroacetic acid, and 10.3 g. of anhydrous sodium acetate in 400 ml. of ethanol was refluxed for 8 hours. The mixture was filtered to remove sodium chloride, and the alcohol was evaporated from the filtrate. The residue was poured into water, and the oily compound of the mixture was extracted with ethyl acetate. Concentration of the ethyl acetate solution yielded 47 g. of product, M.P. 30° C.

COMPOUND 7

A mixture of 3.8 g. of 3-(2,6-diethylphenyl)-2-(2,6-diethylphenylimino)-4-thiazolidine (Intermediate 5), 1.4 g. of 2,5-dimethylbenzaldehyde, and 2 ml. of piperidine in 70 ml. of methanol was refluxed for 5 hours. The alcohol was removed from the reaction mixture in vacuo and the residue was dissolved in ether. This ether solution was washed with dilute hydrochloric acid, then water, and concentrated in vacuo again. The residue was recrystallized from acetonitrile to yield 1.7 g. of product, M.P. 135–137° C.

INTERMEDIATE 4

1,3-bis(2,6-diethylphenyl)-2-thiourea

A mixture of 57.3 g. of Intermediate 1 and 45 g. of 2,6-diethylaniline in 100 ml. of toluene was refluxed for six hours. The reaction solution was concentrated to a thick syrup and poured into 200 ml. of petroleum ether with a vigorous stirring. The product separated as fine white needles, yielding 75 g., M.P. 161–163° C.

INTERMEDIATE 5

A mixture of 22 g. of Intermediate 4, 7.5 g. of chloroacetic acid, and 7.5 g. of sodium acetate in 200 ml. of ethanol was refluxed for six hours. The sodium chloride which separated from the reaction mixture was filtered off, and the alcoholic filtrate was concentrated in vacuo to yield 18.5 g. of product, M.P. 122–124° C.

The other compounds of my invention are prepared to advantage by methods similar to those described for Compounds 3 and 7.

The following table lists the melting points of the ultraviolet absorbing compounds used to illustrate my invention and the intermediates of Formulas III and IV used to prepare these compounds.

INTERMEDIATES USED

| Compound Number | Melting Point, °C. | Benzaldehyde of Formula III [1] | Thiourea of Formula IV [2] |
|---|---|---|---|
| 1 | 67–68 | 2-methyl | 1-cetyl-3-(2,6-diethylphenyl). |
| 2 | dec. >250 | 2-sulfo sodium salt | 3-(2,6-diethylphenyl)-1-octyl. |
| 3 | 61–62 | 2-methoxy | 1-cetyl-3-(2,6-diethylphenyl). |
| 4 | 161–163 | 2-methyl | 3-(2,6-diethylphenyl)-1-hexyl. |
| 5 | 111–112 | do | 1-benzyl-3-(2,6-diethylphenyl). |
| 6 | 123–125 | 2-hexoxy | 1-(2,6-diethylpheny)-3-phenyl. |
| 7 | 135–137 | 2,5-dimethyl | 1,3-bis(2,6-diethylphenyl). |
| 8 | 193–195 | 2-methyl | Do. |
| 9 | 169–171 | Unsubstituted | 1-(2,6-diethylphenyl)-3-(2-ethylphenyl). |
| 10 | 154–156 | 2-methyl | 1-(2,6-diethylphenyl)-3-(2-methylphenyl). |
| 11 | 172–174 | 2,5-dimethyl | Do. |
| 12 | 137–139 | 2,4-dimethyl | 1,3-bis(2,6-diethylphenyl). |
| 13 | 175–178 | 2,5-dimethyl | Do. |
| 14 | 172–175 | 2-methyl | 1-(2,6-diethylphenyl)-3-(2-ethylphenyl). |
| 15 | oil | Unsubstituted | 1-(4-sec.-amylphenyl)-3-(2,6-diethylphenyl). |
| 16 | 120–122 | 2-chloro | 1-benzyl-3-(2,6-diethylphenyl). |
| 17 | >250 | 2-methyl-x-sulfo sodium salt. | Do. |
| 18 | 148–150 | 2-methyl-5-tert.-butyl. | 1,3-bis(2,6-diethylphenyl). |
| 19 | 53–55 | 2,5-dimethyl | 1-cetyl-3-(2,6-diethylphenyl). |
| 20 | 78–80 | 3-dodecyloxy | 1,3-bis(2,6-diethylphenyl). |
| 21 | 57–59 | 4-dodecyl | Do. |

[1] Substituents on benzaldehyde.
[2] Substituents on thiourea.

The ultraviolet absorbing compounds of my invention are incorporated to advantage in any of the hydrophilic colloid binders used in photographic elements, including natural materials, e.g., gelatine, albumin, agar-agar, gum arabic, alginic acid, etc., and synthetic materials, e.g., polyvinyl alcohol, polyvinyl pyrrolidone, cellulose ethers, partially hydrolyzed cellulose acetate, etc. It is advantageous to dissolve the selected ultraviolet compound in a suitable solvent and add this solution to an aqueous solution of the desired binder. Following intimate mixing, the resulting solution or dispersion is coated on a photographic element by any of the known coating techniques. In instances where it is desired to protect a developed and finished color picture against the harmful effects of ultraviolet radiation, the picture is bathed in a solution of one of my compounds until a sufficient amount is imbibed and then the picture is dried.

The compounds of my invention which contain solubilizing groups, such as, the carboxy group, the sulfo group, etc. are advantageously dissolved in an aqueous alkaline solution or alternatively the alkali metal salt of these solubilizing groups may be used with water as the solvent. Solutions of these compounds may be mixed in the hydrophilic colloid alone or in a solution of the colloid and a basic mordant, such as, those disclosed by Minsk in U.S. Patent 2,882,156 issued Apr. 14, 1959.

The compounds of my invention which do not contain a solubilizing group are added advantageously to the hydrophilic colloid solution by the techniques for incorporating couplers as described in U.S. Patents 2,322,027 issued June 15, 1943; 2,801,170 and 2,801,171 both issued June 30, 1957; 2,870,012 issued June 20, 1959; 2,991,177 issued July 4, 1961; etc. For example the compound may be added as a solution in a low-boiling water-insoluble organic solvent, such as, methyl, ethyl, propyl and butyl acetates, isopropyl acetate, ethyl propionate, sec.-butyl alcohol, carbon tetrachloride, chloroform, etc., or in water-soluble organic solvents, such as, methyl isobutyl ketone, β-ethoxyethyl acetate, β-butoxy-β-ethoxyethyl acetate, tetrahydrofurfuryl adipate, diethylene glycol monoacetate, methoxy triglycol acetate, methyl Cellosolve acetate, ethylene glycol, diethylene glycol, dipropylene glycol, etc. The low boiling water-insoluble solvents can be removed from the hydrophilic-colloid by air drying while the water-soluble solvents can be removed by washing the chilled hydrophilic colloid with water. High boiling organic crystalloidal solvents are also used to advantage to dissolve compounds without solubilizing groups. These include (1) alkyl esters of phthalic acid in which the alkyl radical preferably contains less than 6 carbon atoms, e.g., methyl phthalate, ethyl phthalate, butyl phthalate, di-butyl phthalate, amyl phthalate, dioctyl phthalate, etc., (2) esters of phosphoric acid, e.g., triphenyl phosphate, tricresyl phosphate, etc., and (3) alkyl amides or acetanilide, e.g., N-butylacetanilide and N-methyl-p-methyl acetanilide. Mixtures of low-boiling and high boiling solvents, e.g., mixtures of ethyl acetate and dibutyl phthalate may be used to advantage.

The concentration of my compound used in the coating composition can be varied widely and will depend upon the particular use and the effects desired. The optimum concentration can be determined by methods well known in the art.

The photographic elements that are protected to advantage by my ultraviolet absorbing compounds usually have one or more hydrophilic colloid-silver halide emulsion layers coated on a support, e.g., paper, glass, cellulose acetate film, cellulose nitrate film, polyvinyl acetal film, polystyrene film, polyethylene terephthalate film, polyethylene film, and related films of resinous materials. The ultraviolet absorbing layer is applied over or in the layer to be protected. In multilayer color elements the absorbing layer may be over the outer layer, between the top two layers, between the bottom two layers or even in the light-sensitive layer. Alternatively the ultraviolet absorbing material may be applied during or after processing.

Usually my multilayer color elements comprise a support coated in succession with a red-sensitive layer, a green-sensitive layer and a blue-sensitive layer either with or without a bleachable yellow filter layer between the blue-sensitive and green-sensitive layers. The three differently color sensitized layers may be arranged in any other order desired however the yellow filter layer must not be between the blue-sensitive layer and the exposing light source. My ultraviolet absorbing composition is applied so that it will protect the desired layers.

The following examples will further illlustrate my invention.

EXAMPLE 1

Portions of an aqueous solution of gelatin were intimately mixed with the solution of the indicated ultraviolet absorbing compound and coated on a cellulose acetate support. The solutions had equimolar concentrations of the absorbing compounds. After drying, spectral absorption curves were obtained for each coating with a Cary Spectrophotometer. The coatings were then exposed to a Xenon Arc and spectral absorption curves were made after 1 day of exposure. The ultraviolet absorbing compound 5-benzylidene-3-cetyl-2-phenylimino-4-thiazolidone, which is outside my invention, was used as the control. Table 1 shows the percent of loss in otpical density of the coatings to radiation of 360 m$\mu$.

TABLE 1

| Coating Number | U.V. Absorbing Compound | Percent Loss in Density to Radiation of 360 m$\mu$ [1] |
| --- | --- | --- |
| 1 | Control | 61.5 |
| 2 | 1 | 5 |
| 3 | 5 | 9.5 |
| 4 | 7 | 1.4 |
| 5 | 8 | 3.6 |
| 6 | 9 | 8.0 |
| 7 | 10 | 4.0 |
| 8 | 11 | 9.4 |
| 9 | 12 | 1.9 |
| 10 | 14 | 3.7 |
| 11 | 18 | 17 |
| 12 | 18 | 0 |
| 13 | 21 | 3.1 |

[1] Produced by 1 Day's Exposure to Xenon Arc.

The results show that my representative compounds are unexpectedly more stable than the control. Similar results are obtained when other compounds of my invention are incorporated in gelatin and the other hydrophilic colloids mentioned previously.

Example 2

Comparisons of the optical densities to radiation of 360 m$\mu$ made between the control coating and representative coatings 10, 11 and 14 showed that my coatings had 138%, 108% and 146% higher densities respectively than the control. Similarly it can be shown that other coatings of my invention have substantially higher densitives to radiation of 360 m$\mu$ than do prior art absorbers such as the control used.

Example 3

A multilayer color print material was prepared having coated in succession on a paper support, a blue-sensitive gelatino-silver halide layer, a green-sensitive gelatino-silver layer, a gelatin layer containing the ultraviolet absorbing compound indicated in Table 2, and a blue-sensitive gelatino-silver halide layer. The red-sensitive layer contained incorporated phenolic coupler capable of forming a cyan image with oxidized color developer, e.g., one of the compounds 1–10 set out in columns 1–3 of Weissberger et al., U.S. Patent 2,474,293 issued June 28, 1949. The green-sensitive layer contained incorporated pyrazolone coupler suitable for forming a magenta image with oxidized color developer, e.g., one of compounds 1–12 set out in columns 2 and 3 of Loria et al., U.S. Patent 2,600,788, issued June 17, 1952. The blue-sensitive layer contained an incorporated open chain coupler having a reactive methylene group suitable for forming a yellow image with oxidized color developer, e.g., one of the coupler compounds I to XV set out in Tables 3–6 of McCrossen et al., U.S. Patent 2,875,057, issued Feb. 24, 1959. The ultraviolet absorbing compounds were incorporated into the gelatin coating composition according to the techniques described previously using ethyl acetate or the indicated solvent. Samples of these coatings were exposed on a Model 1–B Eastman Sensitometer and thereafter given P–122 Color Print Processing that is known in the art for processing Kodak's Ektacolor Paper. Samples of the processed color prints having a neutral density of 1.0 were exposed to 750,000 foot candle hours of simulated north sky light. The magneta dye loss resulting in each sample from this exposure is listed in the following table.

TABLE 2

| Coating Number | U.V. Absorbing Compound No. | Incorporating Solvent | Percent Loss in Magenta Dye Density |
| --- | --- | --- | --- |
| 1 | Control | None | 23 |
| 2 | 3 | do | 17 |
| 3 | 3 | Tri-o-cresylphosphate (1 pt. to 10 pts. U.V. absorber). | 16 |

The results show that my compound 3 gave an unexpectedly greater amount of protection to the magenta dye than the control 5-benzylidene-3-cetyl-2-phenylimino-4-thiazolidone.

Example 4

Example 3 was repeated using my compound 21 in place of compound 3. The results were comparable to those of Example 3.

Example 5

A color print element similar to that described in Example 3 excepting that no ultraviolet absorbing layer was provided is exposed and processed as in Example 3. One portion of the processed element is bathed in an aqueous solution having about 3% of compound 2 by weight, a second portion is bathed in an aqueous solution having about 3% of compound 17 by weight and the third portion is untreated. The dyes in the color prints that are bathed in solutions of my ultraviolet absorbers are faded substantially less than the unprotected color print when they are exposed to about 500,000 foot candles of simulated north sky light.

Similar results are obtained when other of my compounds having solubilizing groups on them are used over a concentration range of from about 3 to about 20%.

My ultraviolet absorbing compounds are also used to advantage to protect plastic compositions, such as, polyesters against the harmful effects of ultraviolet light.

Example 6

Cellulose acetate butyrate sheets coated from a melt to which are added my compound 8 are found to have substantially less loss of flexural strength than cellulose acetate butyrate sheets without compound 8 upon exposure in a modified Weather-Ometer (Anal. Chem. 25, 460 (1953)). Similar improvements are produced by my compound 9 and other compounds of my invention.

The accompanying drawings FIGS. 1 and 2 show enlarged cross sectional views of my elements.

FIG. 1 shows an element having support 10 coated with light-sensitive silver halide emulsion layer 11, over which is coated filter layer 12 containing 3-(2,6-diethylphenyl)-2-(2,6-diethylphenylimino) - 5 - (2,5 - dimethylbenzylidene)-4-thiazolidone.

FIG. 2 shows a color developed multilayer color element having support 10 coated in succession with layer 13 containing a cyan dye image, layer 14 containing a magenta dye image, filter layer 15 containing 3-(2,6-diethylphenyl)-2-(2,6 - diethylphenylimino) - 5 - (2,5-dimethylbenzylidene)-4-thiazolidone, and layer 16 containing a yellow dye image.

My 4-thiazolidone ultraviolet absorbing compounds are distinguished from previously known 4-thiazolidones by having a 2-(2,6-disubstituted phenylimino) group and a 3-alkyl group or preferably a 3-(2-substituted phenyl) or a 3-(2,6-disubstituted phenyl) group. Alternatively my compounds can have a 2 - (2-substituted phenylimino) group provided the 3-substituent is a 2,6-disubstituted phenyl group. These compounds are valuable because of their high absorption of ultraviolet radiation with unexpected stability to said radiation. The compounds have low melting points and are readily soluble in conventional solvents. Hydrophilic colloid solutions containing my compounds are valuable for coating layers to protect photographic elements against ultraviolet radiation.

The invention has been described in detail with particular reference to preferred embodiments thereof but it will be understood that variations and modifications can be effected within the spirit of the invention as described hereinabove.

I claim:
1. An ultraviolet absorbing compound having the formula:

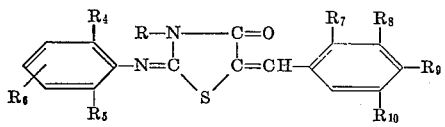

wherein R represents a group selected from the class consisting of an alykl group and a

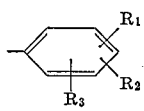

group; $R_1$ and $R_2$ each represent a group selected from the class consisting of the hydrogen atom, a halogen atom, and alkyl having from 1 to 22 carbon atoms; $R_3$ represents a group selected from the class consisting of the hydrogen atom, alkyl having from 1 to 22 carbon atoms, sulfoalkyl having from 1 to 4 carbon atoms, carboxyalkyl having from 1 to 4 carbon atoms and hydroxyalkyl having from 1 to 4 carbon atoms; $R_4$ represents a group selected from the class consisting of a halogen atom and alkyl having from 1 to 22 carbon atoms; $R_5$ represents a group selected from the class consisting of the hydrogen atom, a halogen atom and alkyl having from 1 to 22 carbon atoms such that when $R_5$ represents the hydrogen atom, R must represent a 2,6-substituted phenyl group in which the substituents in the 2- and 6-positions are selected from the class consisting of $R_1$, $R_2$ and $R_3$; $R_6$ represents a group selected from the class consisting of the hydrogen atom, a halogen atom and alkyl having from 1 to 22 carbon atoms; $R_7$ represents a group selected from the class consisting of the hydrogen atom, a halogen atom, alkyl having from 1 to 22 carbon atoms, alkoxy having from 1 to 22 carbon atoms, the carboxy group, a carboxy group alkali metal salt, the sulfo group, a sulfo group alkali metal salt; $R_8$, $R_9$ and $R_{10}$ each represent a group selected from the class consisting of the hydrogen atom, a halogen atom, alkyl having from 1 to 22 carbon atoms, alkoxy having from 1 to 22 carbon atoms, the sulfo group, a sulfo group alkali metal salt, a sulfamyl group, methylsulfonamido, benzenesulfonamido, the carboxy group, a carboxy group alkali metal salt, a carbamyl group, acetamido and benzamido.

2. An ultraviolet absorbing compound having the formula:

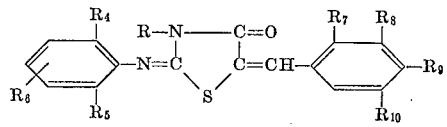

wherein R represents a group selected from the class consisting of an alkyl group and a

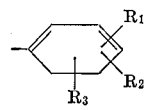

group; $R_1$ and $R_2$ each represent a group selected from the class consisting of the hydrogen atom, a halogen atom, and alkyl having from 1 to 22 carbon atoms; $R_3$ represents a group selected from the class consisting of the hydrogen atom, alkyl having from 1 to 22 carbon atoms, sulfoalkyl having from 1 to 4 carbon atoms, carboxyalkyl having from 1 to 4 carbon atoms and hydroxyalkyl having from 1 to 4 carbon atoms; $R_4$ represents a group selected from the class consisting of a halogen atom and alkyl having from 1 to 22 carbon atoms; $R_5$ represents a group selected from the class consisting of the hydrogen atom, a halogen atom and alkyl having from 1 to 22 carbon atoms such that when $R_5$ represents the hydrogen atom, R must represent a 2,6-di-lower-alkyl substituted phenyl group; $R_6$ represents a group selected from the class consisting of the hydrogen atom, a halogen atom and alkyl having from 1 to 22 carbon atoms; $R_7$ represents a group selected from the class consisting of the hydrogen atom, a halogen atom, alkyl having from 1 to 22 carbon atoms, alkoxy having from 1 to 22 carbon atoms, the carboxy group, a carboxy group alkali metal salt, the sulfo group, a sulfo group alkali metal salt; $R_8$, $R_9$ and $R_{10}$ each represent a group selected from the class consisting of the hydrogen atom, a halogen atom, alkyl having from 1 to 22 carbon atoms, alkoxy having from 1 to 22 carbon atoms, the sulfo group, a sulfo group alkali metal salt, a sulfamyl group, methylsulfonamido, benzenesulfonamido, the carboxy group, a carboxy group alkali metal salt, a carbamyl group, acetamido and benzamido.

3. A compound of claim 1 in which R represents an alkyl group.

4. A compound of claim 1 in which R represents

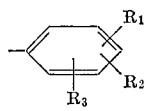

group.

5. The compound 3-(2,6-diethylphenyl)-2-(2,6-diethylphenylimino) - 5 - (3 - dodecyloxybenzylidene)-4-thiazolidone.

6. The compound 3-(2,6-diethylphenyl)-2-(2,6-diethylphenylimino) - 5 - (4-dodecylbenzylidene)-4-thiazolidone.

7. The compound 3-cetyl-2-(2,6-diethylphenylimino)-5-(2-methoxybenzylidene)-4-thiazolidone.

8. The compound 3 - (2,6-diethylphenyl)-2-(2,6-diethylphenylimino) - 5-(2,5 - dimethylbenzylidene)-4-thiazolidone.

9. The compound 3-benzyl-2-(2,6-diethylphenylimino)-5-(2-methyl-5-sulfobenzylidene) - 4 - thiazolidone sodium salt.

References Cited

UNITED STATES PATENTS 2,739,888  3/1956  Sawdey _____ 95—2

JOHN D. RANDOLPH, Primary Examiner

U.S. Cl. X.R.

96—84; 106—176; 260—306.7, 552, 454, 78.4